(12) United States Patent
Ito et al.

(10) Patent No.: US 11,256,229 B2
(45) Date of Patent: Feb. 22, 2022

(54) INDUSTRIAL MACHINERY AND CONTROL METHOD THEREOF

(71) Applicant: Toshiba Kikai Kabushiki Kaisha, Tokyo-to (JP)

(72) Inventors: Takamichi Ito, Numazu (JP); Jun Fujita, Numazu (JP); Atsushi Tada, Numazu (JP); Hirohiko Matsuzaki, Numazu (JP)

(73) Assignee: Shibaura Machine Co., Ltd., Tokyo (JP)

( * ) Notice: Subject to any disclaimer, the term of this patent is extended or adjusted under 35 U.S.C. 154(b) by 18 days.

(21) Appl. No.: 16/745,871

(22) Filed: Jan. 17, 2020

(65) Prior Publication Data

US 2020/0150617 A1 May 14, 2020

Related U.S. Application Data

(63) Continuation of application No. 15/811,895, filed on Nov. 14, 2017, now Pat. No. 10,571,888.

(30) Foreign Application Priority Data

Nov. 16, 2016 (JP) .............................. JP2016-223272

(51) Int. Cl.
*G05B 19/402* (2006.01)
(52) U.S. Cl.
CPC .. *G05B 19/402* (2013.01); *G05B 2219/41112* (2013.01); *G05B 2219/50297* (2013.01)
(58) Field of Classification Search
CPC .................................................. G05B 19/402
See application file for complete search history.

(56) References Cited

U.S. PATENT DOCUMENTS 4,831,365 A * 5/1989 Thomas ............. G05B 19/4065
340/680
10,261,495 B2 * 4/2019 Ishii .................... G05B 19/4065
(Continued)

FOREIGN PATENT DOCUMENTS

JP        S53-119484      10/1978
JP        S58-56753       4/1983
(Continued)

OTHER PUBLICATIONS

Japanese Office Action dated Sep. 29, 2020 issued in JP 2016-223272 (10 pages).
(Continued)

*Primary Examiner* — Mark A Connolly
(74) *Attorney, Agent, or Firm* — DLA Piper LLP US

(57) ABSTRACT

An industrial machinery includes: a drive mechanism driving a control target that moves work or a tool; a motor; a first sensor detecting a position of the control target; a second sensor detecting a position of the motor; a current controller controlling a supply current to the motor; a servo controller outputting a torque instruction to the current controller; and a numerical controller calculating a processing force of the control target to the work based on position information on the control target acquired from the first sensor, position information on the motor acquired from the second sensor, and the torque instruction, the numerical controller determining that the tool is in failure if an absolute value of a first component of the processing force becomes equal to or larger than a first threshold value while processing the work, the first component having a frequency lower than a predetermined frequency.

5 Claims, 12 Drawing Sheets

(56) References Cited

U.S. PATENT DOCUMENTS

2017/0320182 A1  11/2017 Jeong
2018/0013376 A1   1/2018 Sekiguchi

FOREIGN PATENT DOCUMENTS

| JP | 62-166948 | 7/1987 |
| JP | H01-164537 | 6/1989 |
| JP | H05-329750 | 12/1993 |
| JP | H07-204989 | 8/1995 |
| JP | H10-263989 | 10/1998 |
| JP | 2003-326437 | 11/2003 |
| JP | 2015-143969 | 8/2015 |
| WO | WO 2013-073436 | 4/2015 |

OTHER PUBLICATIONS

English Language Abstract for JP S53-119484 published Oct. 18, 1978.
English Language Abstract for WO 2013-073436 published Apr. 2, 2015.

\* cited by examiner

INDUSTRIAL MACHINERY AND CONTROL METHOD THEREOF

CROSS REFERENCE TO RELATED APPLICATIONS

This application claims priority to U.S. patent application Ser. No. 15/811,895 filed on Nov. 14, 2017, and also claims benefit of priority from Japanese Patent Application No. 2016-223272, filed on Nov. 16, 2016, which are incorporated in its entirety.

BACKGROUND OF THE INVENTION

Field of the Invention

The embodiments of the present invention relate to an industrial machinery and control method thereof.

Related Art

An industrial machinery machines work with, for example, a tool attached to a main shaft. A numerical controlling apparatus (hereinafter, also referred to as an NC (Numerical Controller) apparatus) of the industrial machinery outputs an instruction to the main shaft to control an operation of the main shaft and monitors the main shaft torque, or a motor load current. The NC apparatus monitors the main shaft torque to detect failure of the tool used in work processing.

However, for example, if the main shaft torque is small, it is difficult to detect tool failure accurately with the main shaft torque.

In order to detect the tool failure, a sensor to detect a cutting state may be attached to the industrial machinery. However, in this case, the sensor is additionally required, resulting in a bulky and expensive industrial machinery. Another problem is that, once the sensor is in failure, the tool failure cannot be detected.

Accordingly, it is the purpose of the present invention, in order to solve the above problems, to provide an industrial machinery and a method of controlling the same, capable of easily and accurately detecting the tool failure.

SUMMARY OF THE INVENTION

An industrial machinery according to an embodiment includes: a drive mechanism driving a control target that moves work or a tool; a motor operating the drive mechanism; a first position sensor detecting a position of the control target; a second position sensor detecting a position of the motor; a current controller controlling a supply current to the motor; a servo controller outputting a torque instruction to the current controller, the torque instruction deciding the supply current; and a numerical controller calculating a processing force of the control target to the work based on position information on the control target acquired from the first position sensor, position information on the motor acquired from the second position sensor, and the torque instruction, the numerical controller determining that the tool is in failure if an absolute value of a first component of the processing force becomes equal to or larger than a first threshold value while processing the work, the first component having a frequency lower than a predetermined frequency.

The numerical controller may determine that the control target is in failure if the absolute value of the first component does not exceed a second threshold value while processing the work, the second threshold value being smaller than the first threshold value.

An origin of the first component may have an offset based on weight of the control target.

The numerical controller may determine that the control target is in failure based on an absolute value of a second component of the processing force, the second component having a frequency equal to or higher than the predetermined frequency.

An industrial machinery according to an embodiment includes: a drive mechanism driving a control target that moves work or a tool; a motor operating the drive mechanism; a first position sensor detecting a position of the control target; a second position sensor detecting a position of the motor; a current controller controlling a supply current to the motor; a servo controller outputting a torque instruction to the current controller, the torque instruction deciding the supply current; and a numerical controller calculating a processing force of the control target to the work based on position information on the control target acquired from the first position sensor, position information on the motor acquired from the second position sensor, and the torque instruction, the numerical controller determining that the tool is in failure based on an absolute value of a second component of the processing force, the second component having a frequency equal to or higher than a predetermined frequency.

The tool may have at least one blade for cutting the work, wherein the drive mechanism cuts the work while rotating the tool, and the numerical controller determines that the tool is in failure if the second component becomes equal to or larger than a first threshold value during a term shorter than a period of the second component.

The tool may have a plurality of blades for cutting the work, wherein the drive mechanism cuts the work while rotating the tool, and the numerical controller uses the second component to calculate a ratio of processing force of a specific blade to processing force of a first blade among the plurality of blades and determines that the tool is in failure based on the ratio.

The numerical controller may determine that the tool is in failure if an absolute value of a difference between the ratio of the specific blade at a start of processing and the ratio of the specific blade after the start of processing becomes equal to or larger than a third threshold value.

The numerical controller includes a low-pass filtering function or a low-pass filter circuit, wherein the predetermined frequency is a cut-off frequency of the low-pass filtering function or the low-pass filter circuit.

A control method according to an embodiment uses an industrial machinery including a drive mechanism driving a control target that moves work or a tool, a motor operating the drive mechanism, a current controller controlling a supply current to the motor, a servo controller outputting a torque instruction to the current controller, the torque instruction deciding the supply current, and a numerical controller controlling the servo controller. The method includes: calculating a processing force of the tool to the work by the numerical controller based on position information on the control target, position information on the motor, and the torque instruction; and determining that the tool is in failure if an absolute value of a first component of the processing force becomes equal to or larger than a first threshold value while processing the work, the first component having a frequency lower than a predetermined frequency.

The numerical controller determines that the control target is in failure based on an absolute value of a second component of the processing force, the second component having a frequency equal to or higher than the predetermined frequency.

A control method according to an embodiment uses an industrial machinery including a drive mechanism driving a control target that moves work or a tool, a motor operating the drive mechanism, a current controller controlling a supply current to the motor, a servo controller outputting a torque instruction to the current controller, the servo controller deciding the supply current, and a numerical controller to control the servo controller. The method includes: calculating processing force of the tool to the work by the numerical controller based on position information on the motor, position information on the control target, and the torque instruction; and determining that the tool is in failure based on an absolute value of a second component of the processing force, the second component having a frequency equal to or higher than a predetermined frequency.

The tool may have a plurality of blades for cutting the work, wherein the drive mechanism cuts the work while rotating the tool, and the numerical controller uses the second component to calculate a ratio of processing force of a specific blade to processing force of a first blade among the plurality of blades and determines that the tool is in failure based on the ratio.

The numerical controller may determine that the tool is in failure if an absolute value of a difference between the ratio of the specific blade at a start of processing and the ratio of the specific blade after the start of processing becomes equal to or larger than a third threshold value.

The numerical controller may include a low-pass filtering function or a low-pass filter circuit, wherein the predetermined frequency is a cut-off frequency of the low-pass filtering function or the low-pass filter circuit.

DETAILED DESCRIPTION OF THE INVENTION

Embodiments will now be explained with reference to the accompanying drawings. The present invention is not limited to the embodiments.

First Embodiment

Figure 1:
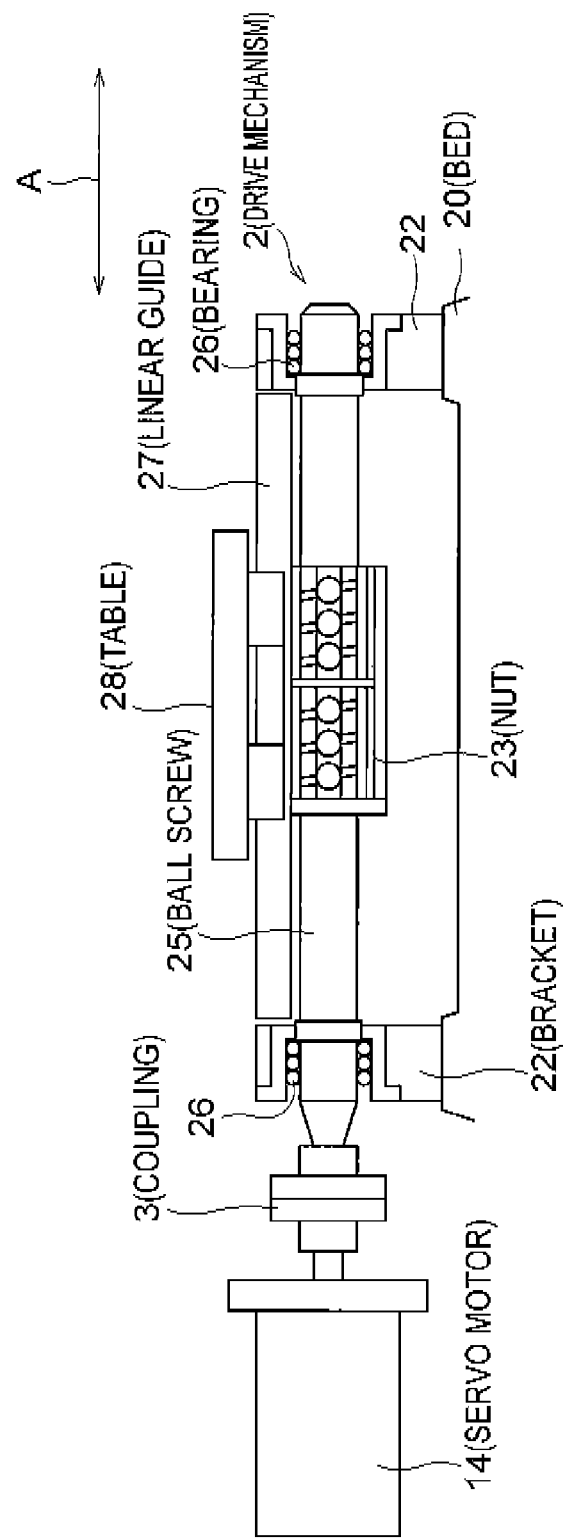
FIG. 1 is a diagram showing an example of the configuration of a servo motor and a drive mechanism of an industrial machinery according to a first embodiment.

FIG. 1 is a diagram showing an example of the configuration of a servo motor 14 and a drive mechanism 2 of an industrial machinery according to a first embodiment. The servo motor 14 is coupled with the drive mechanism 2 via a coupling 3. The drive mechanism 2 is provided with a bed 20, brackets 22, a nut 23, a ball screw 25, bearings 26, a linear guide 27, and a table 28.

The bed 20 is fixed to a main frame of the industrial machinery. On the bed 20, the other components of the drive mechanism 2 are mounted. The brackets 22 are fixed on the bed 20 to support the ball screw 25 on both sides via the bearings 26. The ball screw 25 is coupled with the servo motor 14 via the coupling 3 so as to rotate with the rotation of a shaft of the servo motor 14. The nut 23 has a screw hole to be engaged with a screw portion of the ball screw 25. The nut 23 can move in an axial direction of the ball screw 25, as the ball screw 25 rotates. The table 28 as a control target is fixed to the nut 23 and is supported by the linear guide 27. The table 28 moves in the axial direction (in the directions indicated by an arrow A) of the ball screw 25 and the linear guide 27, as the nut 23 moves. As described, the industrial machinery is capable of transforming the rotary motion of the servo motor 14 into the linear motion of the table 28.

The table 28, on which work is mounted, moves the work relative to the bed 20 in order to cut the work with a tool. In this case, the control target is a moving object such as the table 28 and the work. Or, instead of the table 28, the control target may be a tool motor (not shown) for rotating the tool, a chuck with which the tool is attached to the tool motor, and a main shaft head on which the tool is mounted. In this case, the control target is a moving object such as the table 28, the tool motor, the chuck, and the tool. The tool is used for processing the work, which is, for example, a drill and an end mill. The drill, the end mill, etc. have at least one blade for cutting the work, capable of cutting the work with the blade while rotating.

Figure 2:
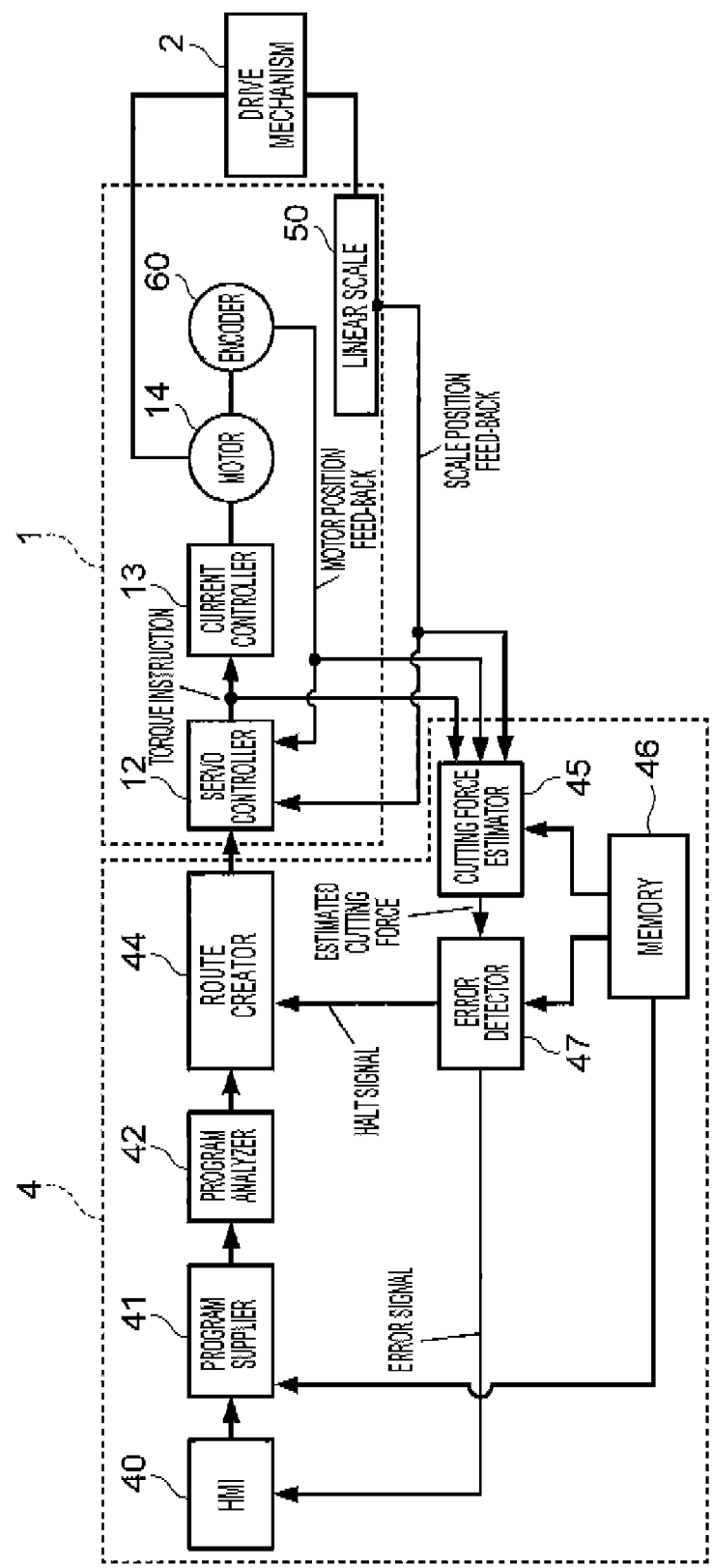
FIG. 2 is a block diagram showing an example of the configuration of a servo unit, the drive mechanism, and a numerical control apparatus according to the first embodiment.

FIG. 2 is a block diagram showing an example of the configuration of a servo unit 1, the drive mechanism 2, and a numerical control apparatus (NC apparatus) 4 according to the present embodiment. The NC apparatus 4 is provided with an HMI (Human-Machine Interface) 40, a program supplier 41, a program analyzer 42, a route creator 44, a cutting force estimator 45, a memory 46, and an error detector 47.

The HMI 40 is an interface between an operator and the numerical control apparatus 4, which is, for example, a touch panel display. The operator inputs or selects a processing program on the HMI 40. The HMI 40 indicates an operating state of the industrial machinery to the operator or displays the occurrence of an error when receiving an error signal from the error detector 47.

The program supplier 41 acquires a processing program stored in the memory 46 and supplies the processing program to the program analyzer 42. The memory 46 is, for example, a ROM (Read Only Memory), a RAM (Random Access Memory), an HDD (Hard Disc Drive) or an SSD (Solid State Drive). The memory 46 stores a system program for controlling the industrial machinery entirely, the processing program, parameters for the industrial machinery, and several types of data. A RAM area in the memory 46 is also used as a loading or working area in execution of the system program and the like.

The program analyzer 42 analyses the processing program acquired from the memory 46 to generate route creation data. The processing program analysis gives, for each block of the processing program, the coordinates of a target position to which a moving part (for example, the table, main shaft head, etc.) of the drive mechanism 2 is to be moved, a target moving speed of the moving part, etc. The block is a basic unit of the processing program, for example, indicating a one-line instruction. One block indicates an instruction for a basic motion, such as, liner motion, arc motion, main-shaft rotation start/halt, etc. The route creation data is generated per block and transferred to the route creator 44.

Based on the route creation data, the route creator 44 generates a position instruction per sampling period (control period of the servo unit 1). The route creator 44 outputs the position instruction to the servo controller 12 of the servo unit 1. The memory 46, the program analyzer 42, the route creator 44, the cutting force estimator 45, and the error detector 47, in the NC apparatus 4, may be integrated into a single CPU (Central Processing Unit) or configured with separate memories or CPUs.

The servo controller 12 outputs a torque instruction to the current controller 13 per control period in accordance with the position instruction. The control period is, for example, about one millisecond. The torque instruction is an instruction for deciding a supply current to the motor 14. The current controller 13 supplies a current in accordance with the torque instruction, to the motor 14. The motor 14 is provided with a rotary encoder 60. The rotary encoder 60, as a second position sensor, detects shaft rotation of the motor 14 to measure the transition of shaft rotary position of the motor 14. The rotary encoder 60 feedbacks the transition of shaft rotary position of the motor 14 to the servo controller 12. Hereinafter, information on the shaft rotary position of the motor 14 is referred to as "motor position" and the action of feed-backing the information is referred to as "motor position feed-back".

As explained with reference to FIG. 1, the motor 14 drives the drive mechanism 2, which causes the table 28 to move along the linear guide 27.

The drive mechanism 2 is provided with a linear encoder 50 connected to the table 28. The linear encoder 50, as a first position sensor, measures the transition of linear position of the table 28. The linear encoder 50 feeds back the transition of linear position of the table 28 to the servo controller 12. Hereinafter, information on the linear position of the table 28 is referred to as "scale position" and the action of feed-backing the information is referred to as "scale position feed-back".

The servo controller 12 receives the feed-back from the linear encoder 50 and the rotary encoder 60 to generate a torque instruction for minimizing an error to instructed positions to control the scale position and the motor position.

Furthermore, the torque instruction, the scale position, and the motor position are fed back to the cutting force estimator 45. Based on the torque instruction, the scale position, and the motor position, the cutting force estimator 45 calculates cutting force to the work as the control target. The cutting force as processing force may, for example, be force to press a drill or an end mill against the work when the drill or the end mill cuts the work or force that the rotating drill or end mill applies to the work. Cutting force Fcut may be calculated by the cutting force estimator 45 that calculates the expression (1) or (2) in the patent document 1.

$$F_{cut} = \frac{1}{R}(K_t I_a^{ref} - J_r \ddot{\theta}_m) - M_t \ddot{x}_t - \frac{1}{R} T_{fric} - F_{fric} \qquad (1)$$

In the above, the sign Ia (hereinafter, referred to as Ia_ref) having ref as a right-upper appendix is an instructed current value obtained from the torque instruction. The sign xt is the scale position, with dots thereabove indicating two-time time derivative. The sign Θm is the motor position (rotation angle), with dots thereabove indicating two-time time derivative. The sign Tfric is friction torque. The sign Ffric is friction force against the linear motion of the table 28 in the direction A. The sign Jr is moment of inertia from the motor to the ball screw. The sign Kt is a torque constant of the motor 14. The sign R is a transformation coefficient between rotary motion components and linear motion components. The sign Mt is mass of the moving object such as the work and the table 28.

Using friction torque Tfric and friction force Ffric both estimated in advance and using a low-pass filter for high-frequency noise reduction, an estimated value of the cutting force Fcut is given by the expression (2).

$$\hat{F}_{cut} = \frac{g_{cut}}{s + g_{cut}} \left[ \frac{1}{R_n}(K_{tn} I_a^{ref} - J_{rn} \ddot{\theta}_m) - M_{tn} \ddot{x}_t - \frac{1}{R_n} \hat{T}_{fric} - \hat{F}_{fric} \right] \qquad (2)$$

In the above, the parameters indicating estimated values are given the sign "hat". The sign "gcut" is a cut-off frequency of a filter in the error detector 47. The right-lower appendix "n" of each parameter indicates a nominal value.

Among the parameters included in the expressions (1) and (2), the parameters, except for the instructed current value Ia_ref obtained from the torque instruction, the scale position xt, and the motor position θm, are stored in the memory 46 in advance. The memory 46 may be built in the NC apparatus 4 or provided outside thereof. The parameters may be received from the outside of the industrial machinery.

The cutting force estimator 45 applies the torque instruction, the scale position and the motor position to the expression (1) or (2) to calculate cutting force to the work. The cutting force estimator 45 receives the torque instruction, the scale position feed-back and the motor position feed-back to calculate the cutting force, per sampling period (control period) of the servo controller 12. As described above, the cutting force estimator 45 can estimate cutting force per control period, without using additional sensors such as a force sensor.

The cutting force discussed above includes cutting force of each tool blade, as a second component. Moreover, not only the second component, the cutting force includes a first component which is friction (for example, the friction torque Tfric and the friction force Ffric), ripples (low-frequency components) due to offset shift in current feed-back of the motor 14 in the current controller 13, etc. When using cutting force including such a variety of frequency-range components, it is difficult for the error detector 47 to accurately detect tool's breakage, wear, etc.

Under consideration of above, the error detector 47 according to the present embodiment, has a low-pass filtering function or a low-pass filter circuit (for example, a moving average filter) to cutoff a second component having a predetermined frequency or higher of the cutting force, thereby extracting a first component having a frequency lower than the predetermined frequency. The predetermined frequency is, for example, a cutoff frequency of the low-pass filter or the low-pass filter circuit of the error detector 47. The error detector 47 determines that the tool is in failure when the first component of the cutting force reaches a first threshold value or larger while processing the work.

For example, the number of blades of the tool (the number of blades that cut the same part of the work for each tool rotation) is denoted as M. The rotation speed of the main shaft for rotating the tool is denoted as N (times of rotation/min). In this case, the peak of cutting force is observed by P=M×N/60 times per minute. In other words, the second component of the cutting force appears at about a frequency of P (Hz) during processing. Therefore, with the low-pass filter, the error detector 47 cuts off the cutting force in a high-frequency range including or higher than P(Hz) to acquire the first component (the cutting force in a low-frequency range lower than P) of the cutting force.

In the present embodiment, a tool failure is determined based on the first component of the cutting force. The error detector 47 determines the tool failure in real time based on the cutting force per sampling period (control period) of the servo controller 12. The tool failure determination will be explained later with reference to FIGS. 3A to 4B.

When a tool error is detected, the error detector 47 outputs a halt signal to the route creator 44 and an error signal to the HMI 40. On receiving the halt signal, the route creator 44 halts position instruction update, so that the motor 14 and the drive mechanism 2 halt. Together with this, on receiving the error signal, the HMI 40 displays the tool failure on a screen, so that a user can realize the tool failure.

FIGS. 3A to 4B are graphs showing an example of a tool-failure determination method according to the present embodiment, the ordinate showing the first component (N (Newton)) of the cutting force in a drilling direction, and the abscissa showing time. In the present embodiment, the drive mechanism 2 moves the table 28 in an almost horizontal direction. Thus, the drive mechanism 2 has, a so-called horizontal axis, with zero (N (Newton)) set at the origin Fcenter of cutting force. In the present embodiment, the NC apparatus 4 performs drilling to the work in a drill mode. Thus, the tool is a drill. The drill mode is specified in an NC program and is used in drilling with the drill.

Figure 3A:
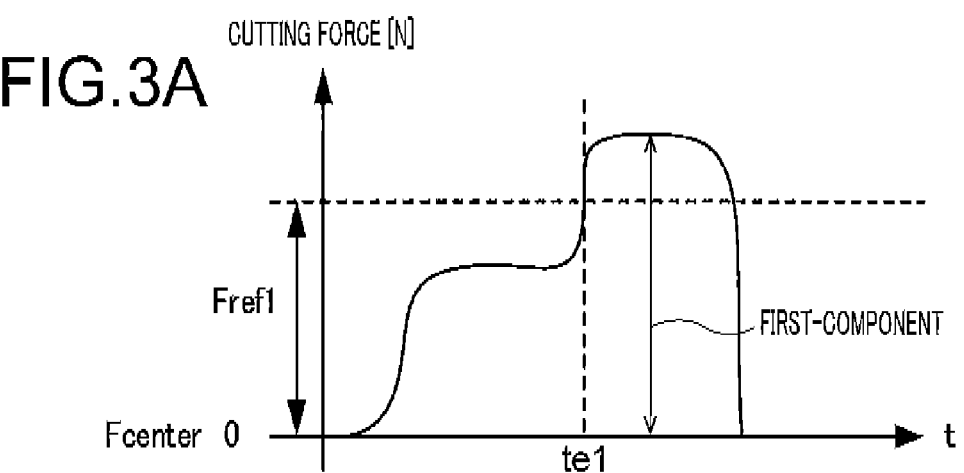
FIGS. 3A to 4B are graphs showing an example of a tool-failure determination method according to the first embodiment.
Figure 3B:
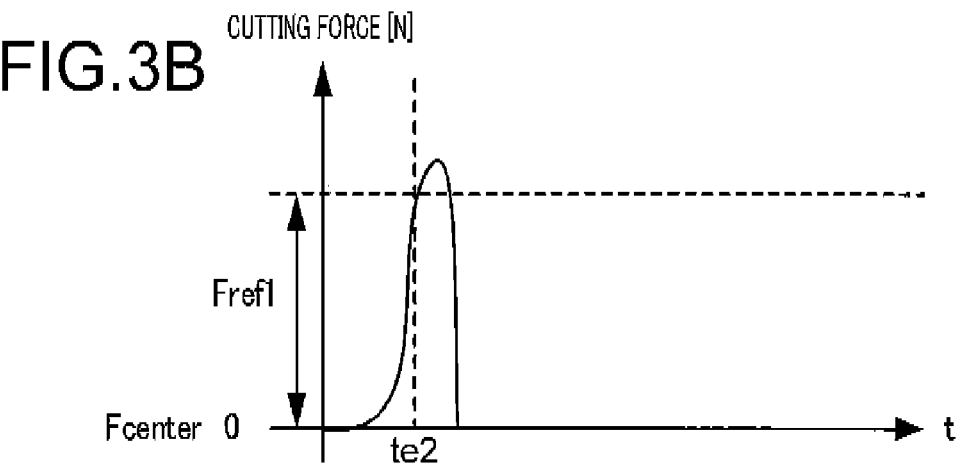

FIGS. 3A and 3B show a drill-breakage detection method. The drill breakage is a failure in which a drill shaft is broken away. The drill may be broken away while the drill is drilling the work or just at the moment at which the drill is made contact with the work. Even if the drill is broken away, as long as there is almost no axis center deviation between a drill neck portion and a drill tip portion and hence the neck portion is made contact with the tip portion, the neck portion continuously presses the tip portion which is not rotating almost at all. That is, while the drill neck portion is rotating to try to continue drilling, the drill tip portion does not rotate almost at all and hence does not cut the work. This results in that, while the work is not being cut, large cutting force is applied in the drilling forward direction.

As shown in FIG. 3A, in the case where the drill is broken away at a time te1 while drilling the work, the cutting force varies normally up to the time te1, and after the time te1, the first component of the cutting force exceeds the upper limit value Fref1 that is the first threshold value. When the first component of the cutting force reaches or exceeds the upper limit value Fref1, the error detector 47 determines that the tool is in failure and outputs the halt signal and the error signal.

As shown in FIG. 3B, in the case where the drill is broken away just at the moment at which the drill is made contact with the work, at a time te2 immediately after the drill is made contact with the work, the first component of the cutting force exceeds the upper limit value Fref1. When the first component of the cutting force reaches or exceeds the upper limit value Fref1, the error detector 47 determines that the tool is in failure and outputs the halt signal and the error signal. The failure shown in FIG. 3B may occur when, for example, the drill blades have already been worn away, so that the drill cannot drill the work even though the drill is made contact with the work. Accordingly, the error detector 47 may determine that the tool is in failure even only once the first component of the cutting force exceeds the upper limit value Fref1.

Figure 4A:
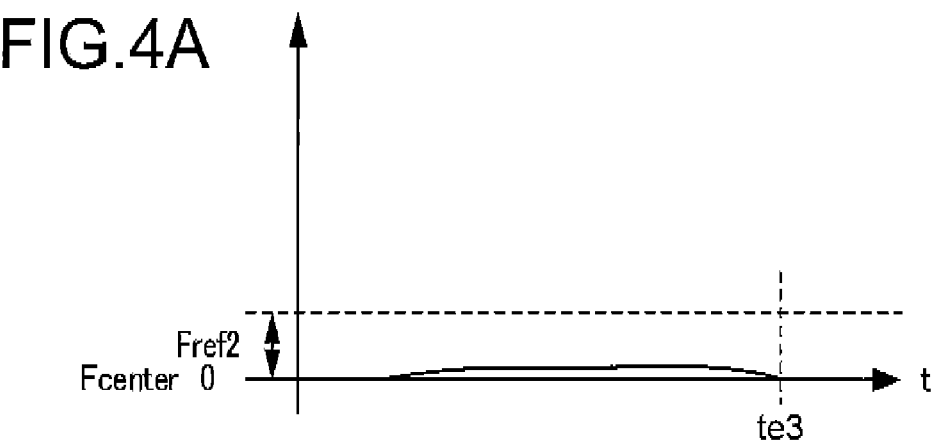
Figure 4B:
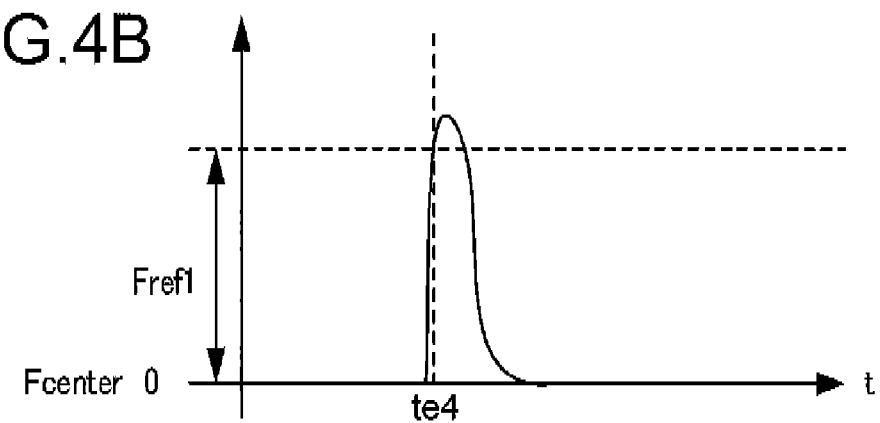

FIGS. 4A and 4B also show a drill-breakage detection method. For example, when the failures shown in FIGS. 3A and 3B are not detected, the drill neck portion moves to drill the next hole, whereas the drill tip portion does not move with the drill neck portion. In this case, axial center deviation occurs between the drill neck portion and the drill tip portion and hence the neck portion is not made contact with the tip portion. Therefore, when the drill does not reach the work, as shown in FIG. 4A, the first component of the cutting force remains small and does not exceed the lower limit value Fref2 that is the second threshold value. The lower limit value Fref2 is a smaller threshold value than the upper limit value Fref1. For example, when the drill is broken away in the vicinity of a chuck with which the drill is attached to a motor, the drill neck portion does not reach the work. Therefore, during work cutting, the first component of the cutting force never exceeds the lower limit value Fref2. In this case, the error detector 47 determines that the tool is in failure. In detail, during work cutting, when the first component of the cutting force never exceeds the lower limit value Fref2, the error detector 47 determines that the tool is in failure and outputs the halt signal and the error signal, at a time te3.

Moreover, even if the drill neck portion reaches the work, the drill cannot cut the work. In this case, as shown in FIG. 4B, the first component of the cutting force becomes equal to or larger than the upper limit value Fref1. Then, the error detector 47 determines that the tool is in failure and outputs the halt signal and the error signal, at a time te4 at which the first component of the cutting force becomes equal to or larger than the upper limit value Fref1.

As described above, the error detector 47 may determine that the tool is in failure when the first component of the cutting force exceeds the upper limit value Fref1 or never exceeds the lower limit value Fref2, during work cutting.

FIGS. 5A to 6B are graphs showing another example of the tool-failure determination method according to the present embodiment. In this example, the drive mechanism 2 moves the table 28 in an almost perpendicular direction (almost vertical direction). Thus, the drive mechanism 2 has a so-called vertical axis. In this case, the weight of moving objects, such as the tool, the motor for rotating the tool, and the table 28 is applied downwards because of gravity. In a waiting mode without cutting, in order to cancel the weight of the moving object by supporting the moving object in a vertical upward direction, the servo unit 1 is required to apply force to the moving object in the vertical upward direction. Therefore, there is an offset at the origin Fcenter in the vertical upward direction, the offset being almost equal to the weight of the moving object. Provided that the vertical upward direction is a positive direction, the origin Fcenter has a positive offset value almost equal to the weight of the moving object, as shown in FIGS. 5A to 6B.

It is supposed that the tool cuts the work in a downward direction. That is, the drive mechanism 2 applies cutting force in the downward direction, with the origin Fcenter as a reference point. Hereinbelow, in FIGS. 5A to 6B, the first component of the cutting force is expressed in absolute values, with the origin Fcenter as the reference point. That is, the first component of the cutting force is the first component of an absolute value (|Fcenter−F^ cut|) of a difference between the origin Fcenter and estimated cutting force F^ cut. Even though the origin Fcenter is being offset, the method shown in FIGS. 5A to 6B is basically the same as the method shown in FIGS. 3A to 4B.

Figure 5A:
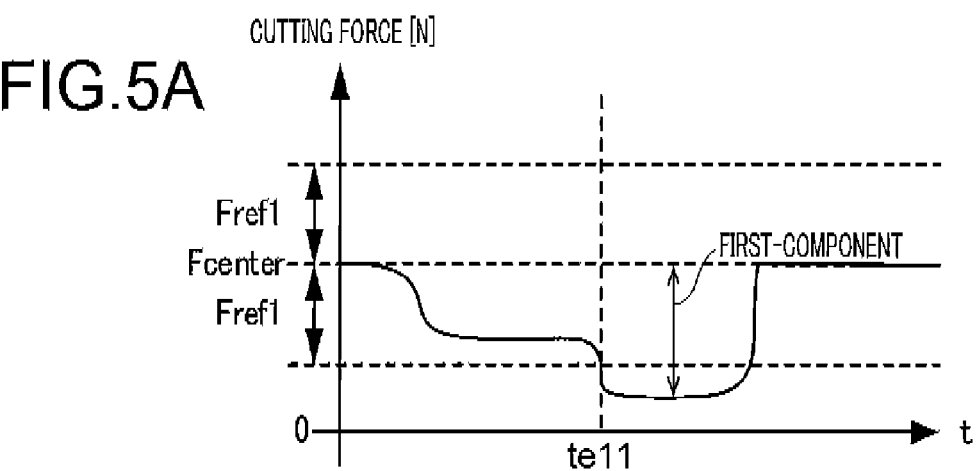
FIGS. 5A to 6B are graphs showing another example of the tool-failure determination method according to the first embodiment.

For example, as shown in FIG. 5A, in the case where the drill is broken away at a time te11 while drilling the work, the absolute value of the cutting-force first component varies normally up to the time te11, and after the time te1, exceeds the upper limit value Fref1. When the absolute value of the cutting-force first component reaches or exceeds the upper limit value Fref1, the error detector 47 determines that the tool is in failure and outputs the halt signal and the error signal.

Figure 5B:
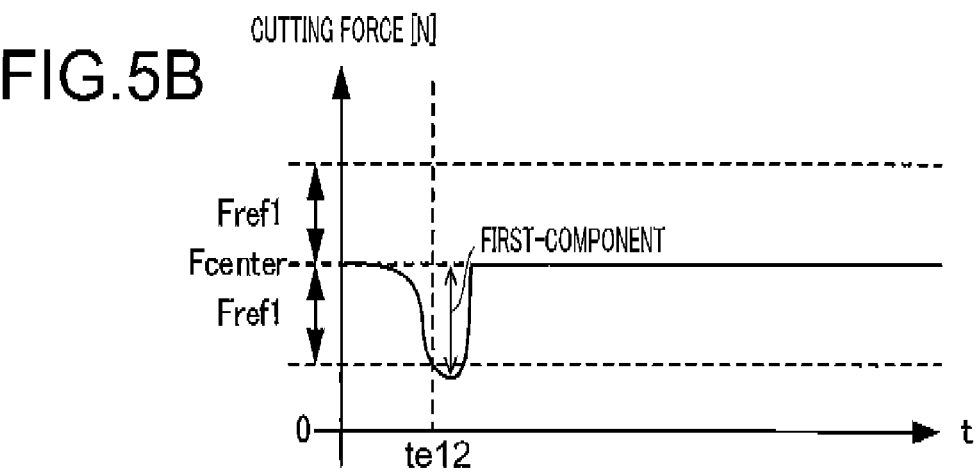

As shown in FIG. 5B, in the case where the drill is broken away just at the moment at which the drill is made contact with the work, at a time te12 immediately after the drill is made contact with the work, the absolute value of the cutting-force first component reaches or exceeds the upper limit value Fref1. When the absolute value of the cutting-force first component reaches or exceeds the upper limit value Fref1, the error detector 47 determines that the tool is in failure and outputs the halt signal and the error signal. The failure shown in FIG. 5B may occur when, for example, the drill blades have already been worn away, so that the drill cannot drill the work even though the drill is made contact with the work. Accordingly, the error detector 47 may determine that the tool is in failure even only once, during work cutting, the absolute value of the cutting-force first component exceeds the upper limit value Fref1.

Figure 6A:
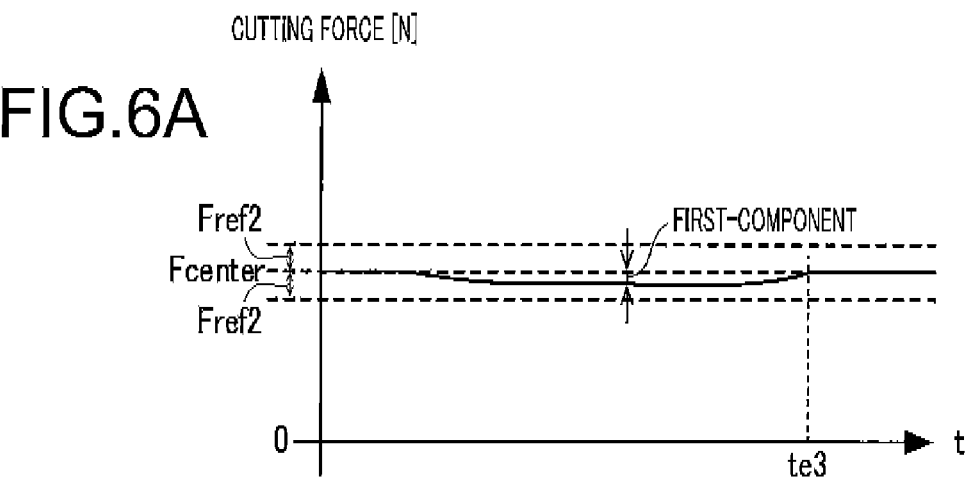

As shown in FIG. 6A, in the case where the drill does not reach the work, the absolute value of the cutting-force first component does not exceed the lower-limit value Fref2. The lower limit value Fref2 is a smaller threshold value than the upper limit value Fref1. For example, when the drill is broken away in the vicinity of a chuck with which the drill is attached to a motor, the drill neck portion does not reach the work. Therefore, during work cutting, the absolute value of the cutting-force first component never exceeds the lower limit value Fref2. In this case, the error detector 47 determines that the tool is in failure. In detail, during work cutting, when the absolute value of the cutting-force first component never exceeds the lower limit value Fref2, the error detector 47 determines that the tool is in failure and outputs the halt signal and the error signal, at a time te3.

Figure 6B:
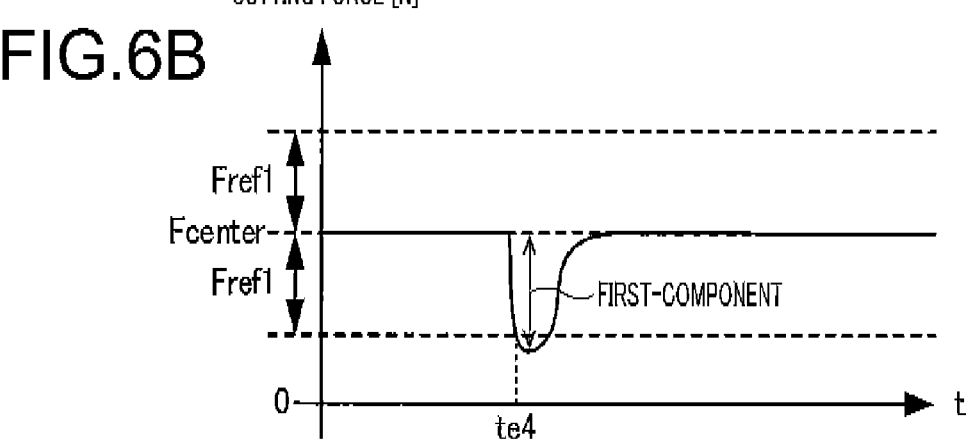

Moreover, as shown in FIG. 6B, in the case where, even if the drill neck portion reaches the work, the drill cannot cut the work, the absolute value of the cutting-force first component reaches or exceeds the upper limit value Fref1. Then, the error detector 47 determines that the tool is in failure and outputs the halt signal and the error signal, at a time te4 at which the absolute value of the cutting-force first component becomes equal to or larger than the upper limit value Fref1. As described above, during work cutting, the error detector 47 may determine that the tool is in failure when the absolute value of the cutting-force first component exceeds the upper limit value Fref1 or never exceeds the lower limit value Fref2.

Figure 7A:
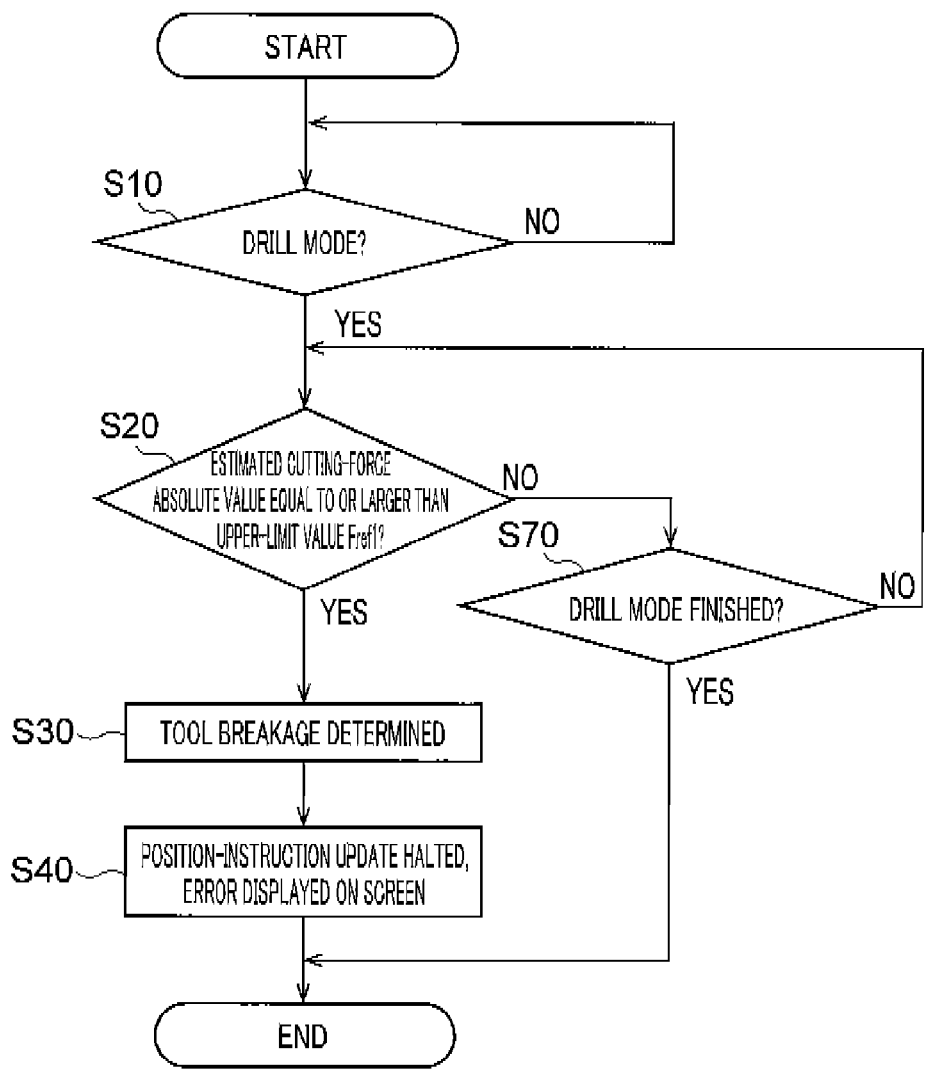
FIGS. 7A and 7B are flowcharts showing a tool-breakage detection operation according to the first embodiment.
Figure 7B:
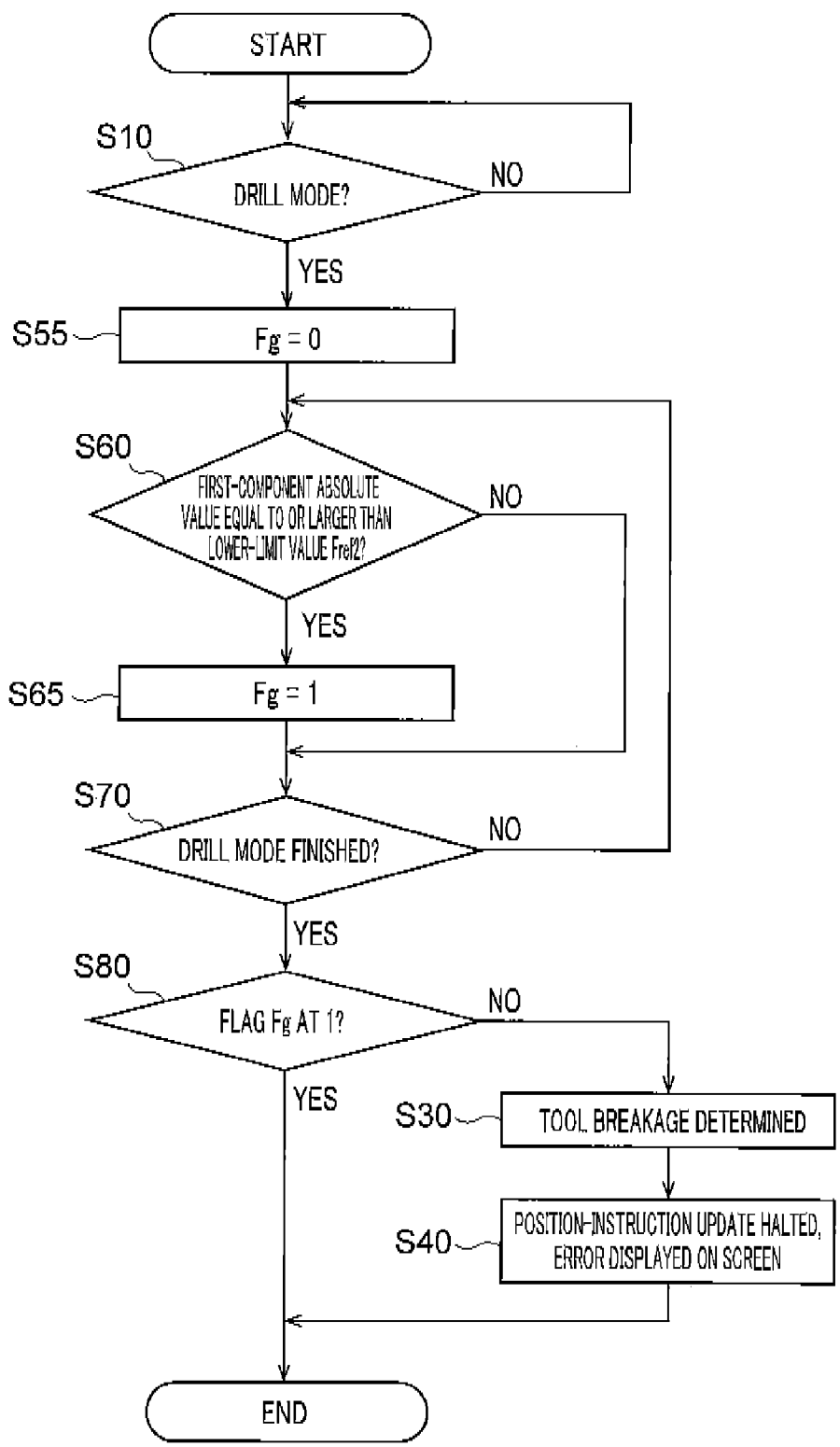

FIGS. 7A and 7B are flowcharts showing a tool-breakage detection operation according to the present embodiment.

Firstly, as shown in FIG. 7A, it is determined whether the NC apparatus 4 is in a drill mode (S10). The drill mode is a step of drilling work with a drill as the tool.

One hole is drilled in the work in a one-time drill mode from START to END in FIGS. 7A and 7B. In the case of drilling a plurality of holes, the drill mode is repeated by the number of holes. If in the drill mode (YES in S10), the error detector 47 acquires estimated cutting force from the cutting force estimator 45. The error detector 47 extracts the first component from the cutting force using the filtering function. The absolute value of the cutting-force first component is compared with the upper-limit value Fref1 (S20). When the drive mechanism 2 has the axis of gravity, as explained with reference to FIGS. 5A to 6B, there is an offset equivalent to the weight of the moving object, at the origin Fcenter of the cutting-force first component. In this case, the cutting-force first component is the first component of an absolute value (|Fcenter−F^ cut) of the difference between the origin Fcenter and the estimated cutting force F^ cut.

If the absolute value of the cutting-force first component is equal to or larger than the upper-limit value Fref1 (YES in S20), the error detector 47 determines that the tool is broken away and transmits the halt signal and the error signal to the route creator 44 and to the HMI 40, respectively (S30). On receiving these signals, the route creator 44 halts position instruction update and the HMI 40 displays an error on the screen (S40).

On the other hand, if the absolute value of the cutting-force first component is smaller than the upper-limit value Fref1 (NO in S20), the error detector 47 determines that the tool is not broken away. In this case, the route creator 44 continuously updates the position instruction.

If the drill mode continues (NO in S70), steps S20 to S70 in FIG. 7A are repeated.

In parallel with the flow of FIG. 7A, the error detector 47 executes the flow shown in FIG. 7B. For example, when the NC apparatus 4 enters the drill mode in step S10 (YES in S10), the error detector 47 sets a flag Fg stored in the memory 46 to zero (S55).

Subsequently, the error detector 47 compares the absolute value of the cutting-force first component with the lower-limit value Fref2 (S60). If the absolute value of the first component is smaller than the lower-limit value Fref2 (NO in S60), the error detector 47 continues the drill mode without changing the flag Fg (NO in S70). If the absolute value of the first component is equal to or larger than the lower-limit value Fref2 (YES in S60), the error detector 47 changes the flag Fg to 1 and continues the drill mode (S65 and NO in S70).

When steps S60 and S70 in FIG. 7B are repeated to finish the drill mode (YES in S70), the error detector 47 checks if the flag Fg in the memory 46 is 1 (S80). If the flag Fg is 1 (YES in S80), that is, when the absolute value of the first component has exceeded the lower-limit value Fref2 even once, the error detector 47 determines that the tool is not broken away. On the other hand, if the flag Fg is zero (NO in S80), that is, when the absolute value of the first component has never exceeded the lower-limit value Fref2 during the drill mode, the error detector 47 determines that the tool is broken away and transmits the halt signal and the error signal to the route creator 44 and the HMI 40, respectively (S30). On receiving these signals, the route creator 44 halts position instruction update in the next drill mode and the HMI 40 displays an error on the screen (S40).

In the case where tool breakage is detected, for example, with an error message, a message to urge tool replacement is displayed on the HMI 40. With the tool replacement by a user, the NC apparatus 4 can continue processing.

The error detector 47 may execute the flows of FIGS. 7A and 7B in parallel. Nevertheless, the error detector 47 may execute either one of the flows of FIGS. 7A and 7B after the other.

As described above, the NC apparatus 4 can detect tool breakage using the first component of the cutting force. The NC apparatus 4 according to the present embodiment performs tool chipping detection with both of the upper-limit value Fref1 and the lower-limit value Fref2. Nevertheless, the error detector 47 may perform the tool chipping detection with either one of the upper-limit value Fref1 and the lower-limit value Fref2.

If tool failure detection like the present embodiment is not performed, tool breakage cannot be accurately detected. If the tool breakage cannot be accurately detected, holes may not be drilled in the work in the middle of multiple-hole drilling by an NC-programmed automatic operation. In this case, continuation of a drilling operation merely consumes time and cost for a user.

In contrast, the industrial machinery according to the present embodiment detects tool breakage using the first component of the estimated cutting force (F^ cut). The second component of the cutting force is generated due to cutting by each tool blade and hence varies due to wear, chipping, etc. of each tool blade. In contrast, the first component of the cutting force varies due to abnormality or failure such as breakage of the tool itself, which steadily varies the degree of wear largely. Therefore, in the present embodiment, abnormality or failure such as tool breakage can be accurately and surely detected using the first component of the cutting force. In the case of drilling using a drill, the cutting force is force to press the tool against the work, and hence the cutting force includes much more first components than second components. In this case, the lower-limit value Fref2 is extremely small and set to a value close to zero.

The present embodiment does not require additional parts (an additional sensor and the like). Therefore, the industrial machinery according to the present embodiment is excellent in compactness and cost performance, with no necessity of consideration of failure of additional parts.

Second Embodiment

Figure 8:
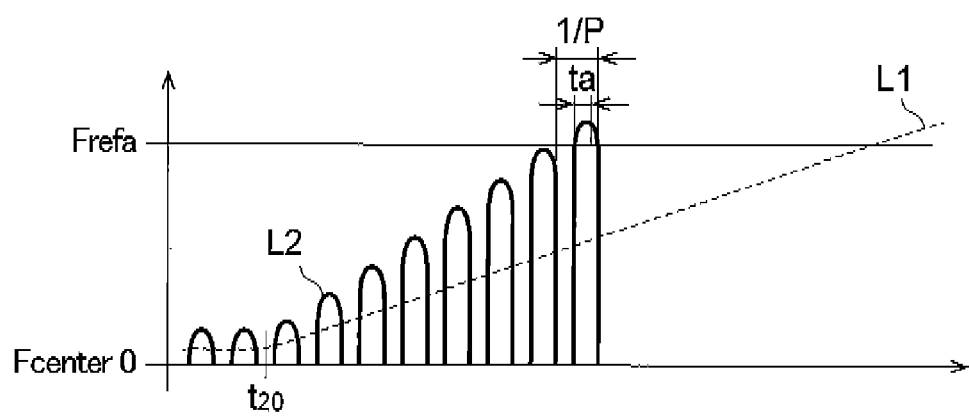
FIG. 8 is a graph showing an example of a tool failure determination method according to a second embodiment.

FIG. 8 is a graph showing an example of a tool failure determination method according to a second embodiment, the ordinate showing cutting force including the second component and the first component, and the abscissa showing time. It is a precondition that the drive mechanism 2 has a horizontal axis, with zero (N(Newton)) set at the origin Fcenter of the cutting force. In the case where the drive mechanism 2 has the axis of gravity, the origin Fcenter may be offset, as explained with reference to FIGS. 4A and 4B. Thus, the explanation of the case with the axis of gravity is omitted here.

For example, a tool having at least one blade, such as an end mill, cuts the same part of work by the number of blades per rotation. When the number of blades is M and the rotation speed at which the tool rotates is N (times of rotation/min), the second component of the cutting force has a waveform with a frequency of $P=M \times N/60$ (Hz) during processing, as explained above. Therefore, the error detector 47 can acquire the first component of the cutting force by cutting off the cutting force in a high-frequency range including or higher than P(Hz). In FIG. 8, a solid line L2 represents the second component of the cutting force and a broken line L1 represents the first component of the cutting force.

When the tool is cutting normally before a time t20, the second component having a frequency of P(Hz) appears. However, as the tool suffers blade wear, the tool cutting performance is lowered. This causes larger cutting force per blade, which then causes the second component to be larger. The first component also becomes larger because it includes a direct current component obtained by passing the second component through a low-pass filter. Therefore, as the tool suffers blade wear, the first and second components of the cutting force become gradually larger, as indicated by the lines L1 and L2 of FIG. 8.

As the tool is worn away further, the tool can hardly cut the work, which leads to a larger error in actual-scale positions (position error) to the position instruction. In this case, the industrial machinery may halt due to errors. If the state in which tool is worn away further (referred to as severe wear) continues, the tool may be seized at the work, which gives an adverse effect to the quality of the work machined surface.

In the second embodiment, in order to detect severe wear of the tool, the error detector 47 measures a term during which the second component is equal to or larger than the upper-limit value Frefa. If the term is longer than a predetermined term ta, the error detector 47 determines that the tool is in failure. The upper-limit value Frefa as the first threshold value may be equal to or different from the upper-limit value Fref1 of the first embodiment. The error detector 47 has a timer function to measure the term ta.

For example, in the case where the second component is used for failure determination, the error detector 47 determines that the tool is in failure when a term from a moment at which L2 shown in FIG. 8 becomes equal to or larger than the upper-limit value Frefa exceeds the term ta without intermission. In this case, the error detector 47 outputs the halt signal and the error signal of FIG. 2.

As an option, in the case where the first component of the cutting force is used in failure determination, the error detector 47 determines that the tool is in failure when L1 shown in FIG. 8 becomes equal to or larger than the upper-limit value Frefa. In this case, the error detector 47 outputs the halt signal and the error signal of FIG. 2.

The term ta is set to be larger than zero but shorter than a period (1/P) of the second component of the cutting force, as indicated by an expression 3.

$$0 < ta < 1/P \quad \text{(expression 3)}$$

Accordingly, with the cutting force including the second component, the error detector 47 can accurately detect tool failure. Moreover, according to the present embodiment, the error detector 47 can accurately detect tool failure when the cutting force gradually varies in the case of, for example, tool severe wear.

Failure detection according to the second embodiment may be performed in each tool cutting direction (X, Y, Z). In this case, upper-limit values Frefx, Frefy, and Frefz may be set for the cutting force along an X-axis, a Y-axis, and a Z-axis, respectively. When the number of blades M of the tool, which are made contact with the work, and also the rotation speed N are constant in an X-direction, a Y-direction, and a Z-direction, the term ta may be the same for an X-component, a Y-component and a Z-component. When the number of blades M of the tool and/or the rotation speed N are/is different in the X-, Y- and Z-directions, different terms ta may be set for each of the X-, Y- and Z-components.

Figure 9:
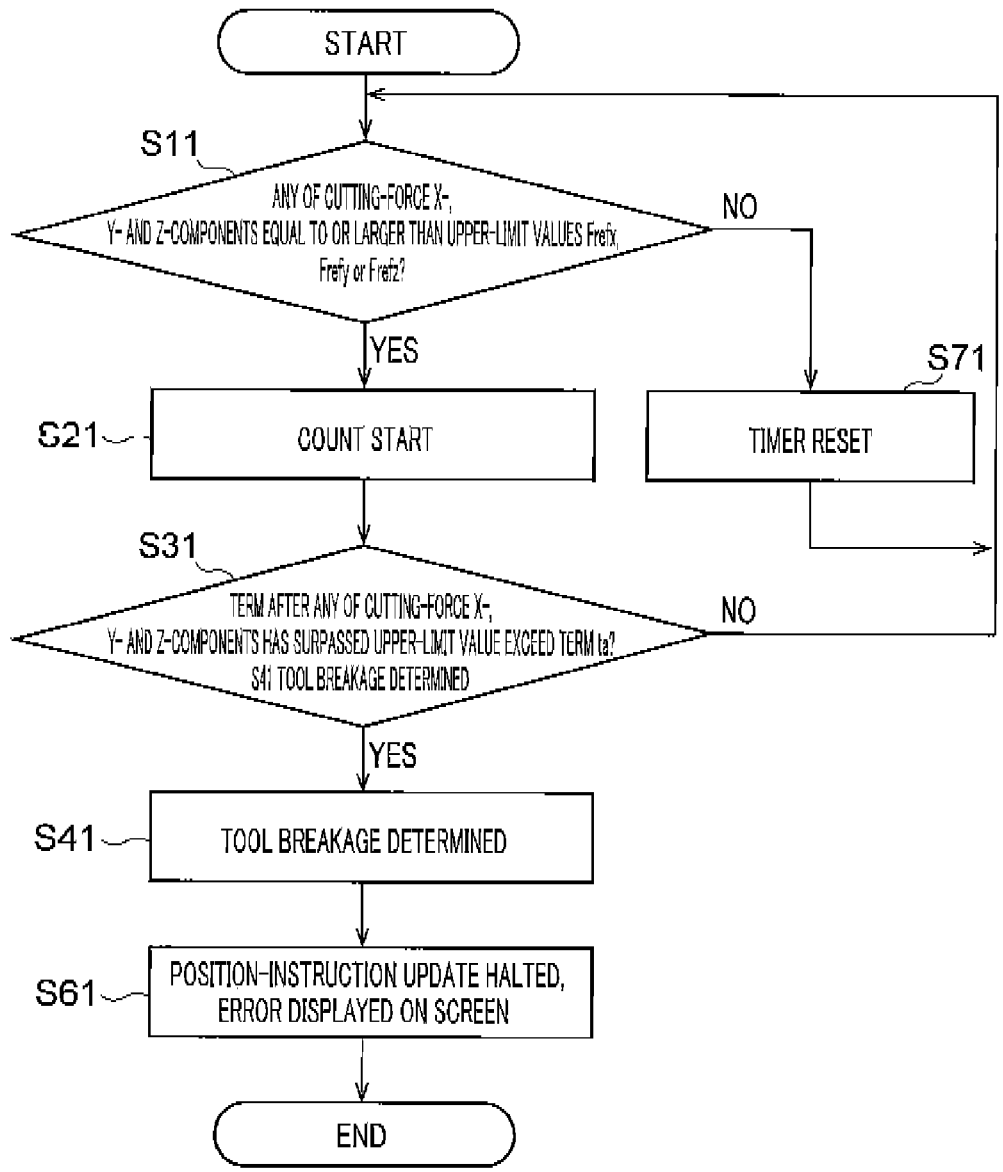
FIG. 9 is a flowchart indicating a tool severe-wear detection operation based on the second component according to the second embodiment.

FIG. 9 is a flowchart indicating a tool severe-wear detection operation based on the second component according to the second embodiment. In an example of FIG. 9, the term ta is the same for an X-component, a Y-component and a Z-component of the cutting-force second component. It is defined hereinbelow that the X-, Y- and Z-components are those of the second component.

Firstly, the error detector 47 determines whether the X-component, Y-component and Z-component of the cutting force are equal to or larger than the upper-limit values Frefx, Frefy and Frefz, respectively (S11). If the X-, Y- and Z-components of the cutting force are smaller than the upper-limit values Frefx, Frefy, and Frefz, respectively (NO in S11), the error detector 47 determines that the tool is not in failure. In this case, the error detector 47 resets the timer once or puts the timer in a reset mode (S71) and repeats step S11. On the other hand, if any one of the X-component, Y-component, and Z-component of the cutting force is equal to or larger than the upper-limit value Frefx, Frefy or Frefz (YES in S11), the error detector 47 starts the timer function (count-up)(S21).

If the term after any one of the X-, Y- and Z-components of the cutting force has surpassed the associated upper-limit value does not exceed the term ta (NO in S31), the error detector 47 repeats steps S11 to S31. In step S11, if the X-, Y- and Z-components of the cutting force are smaller than the upper-limit values Frefx, Frefy and Frefz, respectively, it is determined that the tool is still not in failure, and the error detector 47 resets the timer function (S71) and returns to step S11. The error detector 47 continues monitoring the cutting operation and the cutting force. In essence, the error detector 47 determines that the tool is not in failure, if any one of the X-, Y- and Z-components of the cutting force becomes smaller than the associated upper-limit value before the term after the above one component has surpassed the associated upper-limit value exceeds the term ta.

On the other hand, if the term after any one of the X-, Y- and Z-components of the cutting force has surpassed the associated upper-limit value exceeds the term ta with no intermission (YES in S31), the error detector 47 determines that the tool is in failure (severe wear) (S41). In this case, the error detector 47 transmits the halt signal and the error signal to the route creator 44 and the HMI 40, respectively. On receiving these signals, the route creator 44 halts position instruction update and the HMI 40 displays an error on the screen (S61).

On the contrary, if the second component of any one of the X-, Y- and Z-components of the cutting force becomes smaller than the associated upper-limit value before the term after the second component has surpassed the associated upper-limit value exceeds the term ta (NO in S31), the error detector 47 determines that the tool is not in failure and returns to step S11 to continue monitoring of the cutting operation and the cutting force. In this case, the error detector 47 resets the timer function (S71). Accordingly, even if the cutting force contains noises, the error detector 47 operates without determining tool failure. That is, by setting the term ta, the effect of noises of the cutting force can be eliminated.

As described above, the NC apparatus 4 according to the present embodiment determines that the tool is in failure (severe wear) if the term after the second component of any one of the X-, Y- and Z-components of the cutting force has surpassed the associated upper-limit value exceeds the term ta without intermission. In this way, the NC apparatus 4 according to the present embodiment can accurately and surely detect tool severe wear. By accurately and surely detecting tool severe wear, it is possible to prevent the industrial machinery from being halt due to position errors and the tool from being seized at the work, thereby maintaining the work machined surface in high quality.

The second embodiment may be combined with the first embodiment.

Third Embodiment

In the first and second embodiments, the NC apparatus 4 performs tool failure detection using the first component of the cutting force. Different from this, in the third embodiment, the NC apparatus 4 performs tool failure detection using the second component of the cutting force. The cutting force may be calculated in the same manner as explained in the first or second embodiment.

The second component of the cutting force will be explained. If any one of the tool blades is chipped way or worn away, there is a bigger change in the second component than in the first component, in the cutting force. For example, if the tool has many blades and, if one of the blades is chipped way, although there is a small change in the cutting force of the entire tool, there is a big change in the cutting force of the chipped blade. In this case, it is preferable for the NC apparatus 4 to use the second component that represents each blade cutting force, for tool failure detection. Therefore, the NC apparatus 4 eliminates the first component containing ripples from the cutting force.

Ripples are, for example, pulsating components contained in a current in the current controller 13, which is caused by, for example, offset shift in current feed-back in the current controller 13. Ripples are superimposed, as sign waves, on a cutting force waveform in each rotation of the motor 14, the number of the sign waves corresponding to the number of pole pairs of the motor 14.

Under consideration of above, the error detector 47 has a low-pass filtering function or a low-pass filter circuit for cutting off a frequency range having a frequency fma or higher. The low-pass filterer allows the cutting force calculated in the first embodiment to pass therethrough. The error detector 47 acquires the first component of the cutting force, which contains low-frequency range ripples. The error detector 47 eliminates the first component from the cutting force to acquire the second component of the cutting force. That is, the error detector 47 extracts the first component containing ripples through the low-pass filter and eliminates the first component from the cutting force to acquire the second component of the cutting force.

The cutoff frequency fma of the low-pass filter has a relationship given by an expression 4.

$$fm < fma < P \quad \text{(Expression 4)}$$

Here, fm is a ripple frequency and P is a frequency of the second component of the cutting force (that is, M×N/60).

According to the above relationship, the error detector 47 extracts the first component containing ripples of the cutoff frequency fma or lower and eliminates the first component from the cutting force to acquire the second component having a frequency of P or higher.

Subsequently, a failure detection method using the second component of the cutting force will be explained.

Figure 10A:
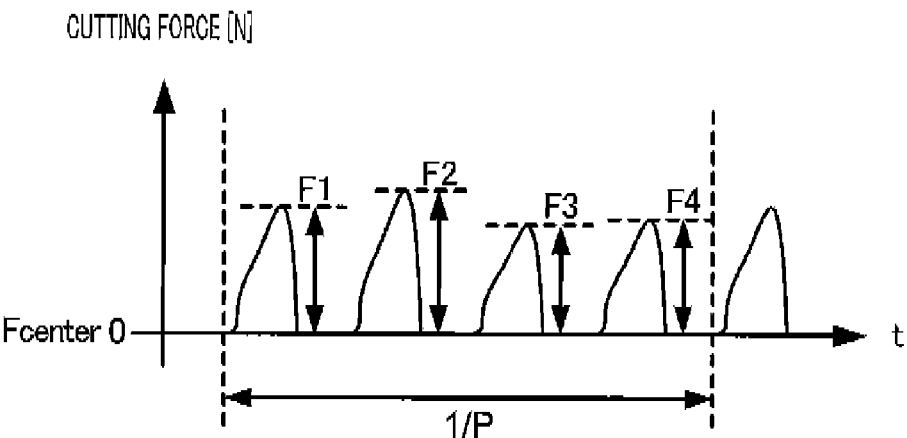
FIGS. 10A and 10B are graphs showing the second component of the cutting force according to the third embodiment.
Figure 10B:
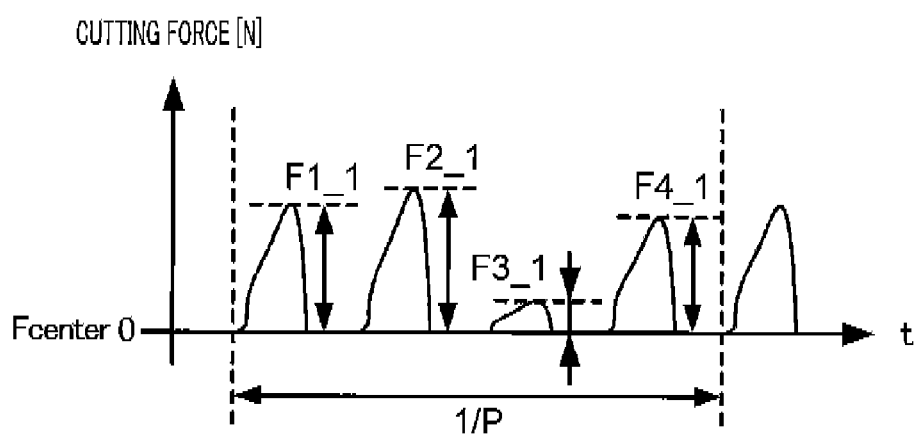

FIGS. 10A and 10B are graphs showing the second component of the cutting force according to the third embodiment, the ordinate showing the second component of the cutting force and the abscissa showing time. FIG. 10A shows cutting force F1 to F4 in an initial state where the tool is just used. FIG. 10B shows cutting force F1_1 to F4_1 after that the cutting operation has been performed with the tool for a certain period of time. It is a precondition in the third embodiment that the drive mechanism 2 has a horizontal axis, and hence zero (N(Newton)) may be set at the origin Fcenter of the cutting force. In the case where the drive mechanism 2 has the axis of gravity, the origin Fcenter may be offset, as explained with reference to FIGS. 4A and 4B. Thus, the explanation of the case with the axis of gravity is omitted here.

The tool has, for example, four blades that cut the work in each rotation. In this case, F1 to F4 in FIG. 10A denote cutting force associated with the tool's four blades, respectively. In FIG. 10B, F1_1 to F4_1 also denote cutting force associated with the tool's four blades, respectively. In each rotation of the tool, the cutting force F1 to F4 or F1_1 to F4_1 are acquired. Since one rotation of the tool is 1/P(sec), the cutting force F1 to F4 or F1_1 to F4_1 repeatedly appear at an interval of 1/P.

The tool's blades are in different conditions even in an initial state (new blades). For example, the distance from the tool's rotation center to each blade tip is little bit different among the blades, and hence the cut depth is different among the blades. Moreover, a little while after the tool is used, the difference among the blade cutting force F1_1 to F4_1 may become larger. For example, referring to FIGS. 10A and 10B, the cutting force F3_1 is extremely smaller than F3 of the initial state. This indicates that the third one among the four tool blades is chipped away or worn away compared to the others.

Then, the error detector 47 detects tool failure based on the second component of the cutting force. In detection of the tool failure, the error detector 47 uses ratios R1, R2 and R3 of the cutting force F2, F3 and F4, respectively, to the first-blade cutting force F1, among the cutting force F1 to F4 of the second component. For example, R1, R2, and R3 are given by F2/F1, F3/F1 and F4/F1, respectively.

In this case, the blade initial-state cutting force F1 to F4 are acquired from the second component of the cutting force calculated at the start of processing. The error detector 47 uses the initial-state cutting force F1 to F4 to calculate F2/F1, F3/F1 and F4/F1, and stores them as R1, R2 and R3, respectively, in an internal memory of the error detector 47 or the memory 46. A ratio (F1/F1=1) of the first-blade cutting force F1 to the first-blade cutting force F1 may also be stored in the memory. The ratios R1 to R3 indicate variation in the initial-state cutting force among the blades. With the ratios, if the cutting force of a specific blade varies during processing, the error detector 47 can determine whether it is a change due to wear of the entire blades of the tool (a normal change) or a change due to chipping or extreme wear of the specific blade (an abnormal change).

After the start of processing, the error detector 47 uses ratios R1_1 to R3_1 of the cutting force F2_1 to F4_1 to the first-blade cutting force F1_1, among the cutting force F1_1 to F4_1 of the blades. For example, R1_1, R2_1 and R3_1 are given by F2_1/F1_1, F3_1/F1_1 and F4_1/F1_1, respectively. The error detector 47 uses the cutting force F1_1 to F4_1 to calculate F2_1/F1_1, F3_1/F1_1 and F4_1/F1_1, and stores them as R1_1, R2_1 and R3_1, respectively, in the internal memory of the error detector 47 or the memory 46. A ratio (F1_1/F1_1=1) of the first-blade cutting force F1_1 to the first-blade cutting force F1_1 may also be stored in the memory.

Subsequently, the error detector 47 compares |Ri_1−Ri| with a threshold value S, i being an integer of 1 to 3. The threshold value S, as the third threshold value, is a positive number of 1 or smaller, stored in the memory 46 in advance. The threshold value S may, for example, be in the range from 0.2 to 0.5. If |Ri_1−Ri| is equal to or smaller than the threshold value S, the error detector 47 determines that the tool is not in failure. If |Ri_1−Ri| becomes larger than the threshold value S, the error detector 47 determines that the tool is in failure.

For example, when all of the tool blades are worn away almost in the same degree from the initial state, Ri_1 does not vary from Ri so much. Therefore, |Ri_1−Ri| remains equal to or smaller than the threshold value S. In this case, the error detector 47 determines that the tool is not in failure. That is, even if there is a variation in the cutting force of the blades in the initial state, if the ratio Ri remains unchanged during cutting, the error detector 47 determines that the tool is not in failure.

On the contrary, when a specific blade is chipped away or extremely worn away compared to the other blades, the cutting force of the specific blade becomes extremely smaller than the cutting force of the other blades. For example, as shown in FIG. 10B, the cutting force F3_1 of the third blade is extremely smaller than the cutting force F1_1, F2_1 and F4_1 of the other blades. In this case, the third blade may have been chipped away. The ratio R2_1=F3_1/F1_1 is lowered from R2=F3/F1 very much. Therefore, |Ri_1−Ri| becomes larger than the threshold value S. In this case, the error detector 47 determines that the tool is in failure. That is, when the ratio Ri_1 of the cutting force of the blades during cutting shows a big difference from the ratio Ri of the initial state, the error detector 47 determines that the tool is in failure.

The error detector 47 determines that the cutting force F1_1 of the first blade is abnormal when every |Ri_1−Ri| becomes equal to or larger than the threshold value S. This is because, the abnormality of the cutting force F1_1 is related to all of R1_1 to R3_1.

Figure 11:
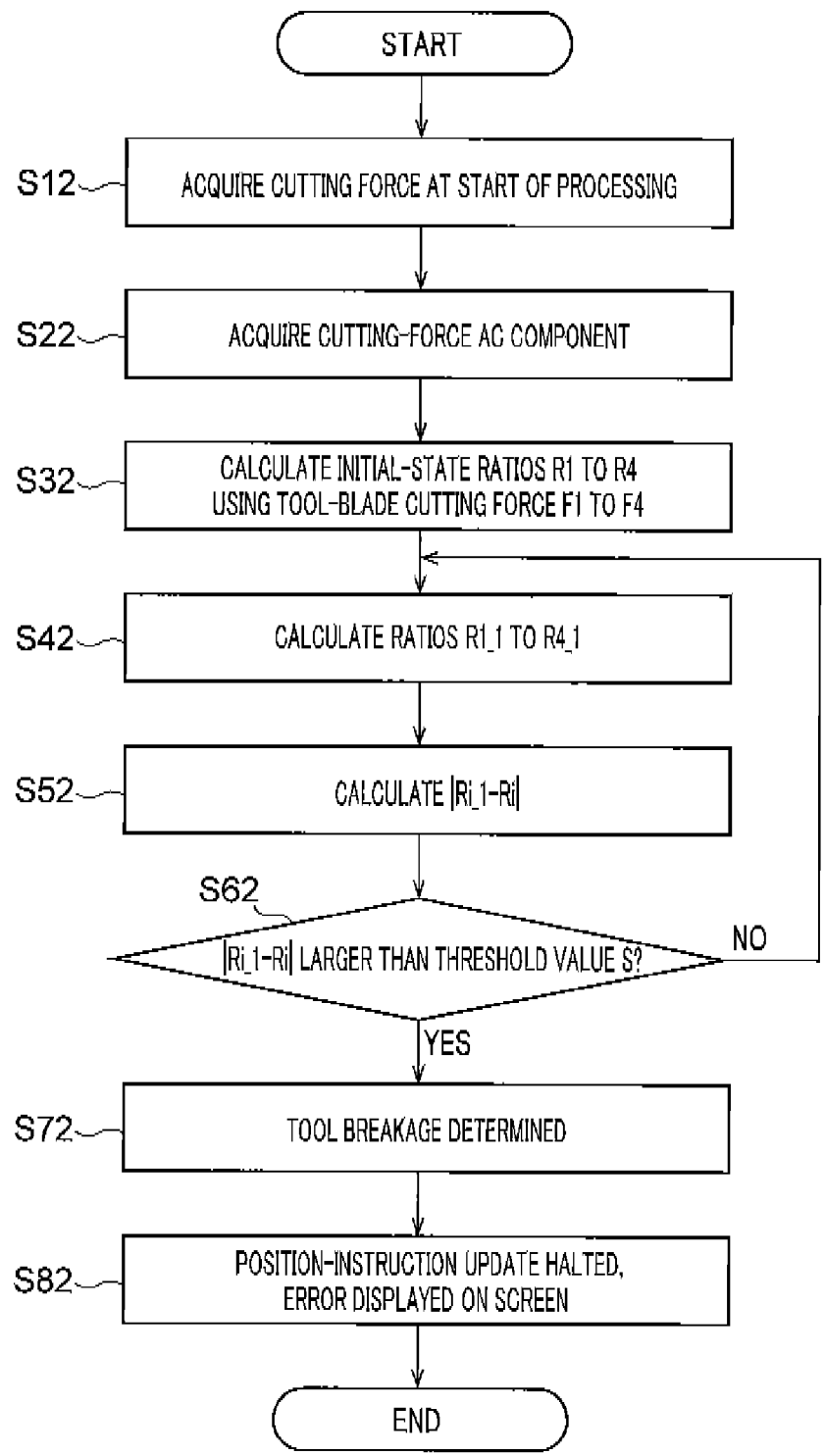
FIG. 11 is a flowchart showing a tool breakage detection operation according to the third embodiment.

FIG. 11 is a flowchart showing a tool breakage detection operation according to the third embodiment.

At the start of processing, the error detector 47 acquires cutting force estimated by the cutting force estimator 45 (S12). The error detector 47 extracts the first component from the cutting force through the low-pass filter and eliminates the first component from the cutting force to acquire the second component (S22).

Subsequently, the error detector 47 calculates the cutting force F1 to F4 of the tool blades from the absolute value of the cutting-force second component. Moreover, the error detector 47 calculates the initial-state ratios R1 to R3 using the cutting force F1 to F4 (S32). The ratios R1 to R3 are stored in the memory 46 or the internal memory of the error detector 47.

Thereafter, for each control period, the error detector 47 calculates the ratios R1_1 to R3_1 based on the cutting force from the cutting force estimator 45, in the same manner as steps S12 to S32 (S42). The ratios R1_1 to R3_1 are also stored in the memory 46 or the internal memory of the error detector 47. Furthermore, the error detector 47 calculates |Ri_1−Ri| (S52) and compares |Ri_1−Ri| with the threshold value S (S62).

If |Ri_1−Ri| is equal to or smaller than the threshold value S (NO in S62), the error detector 47 determines that the tool is not in failure and continues monitoring of the cutting operation and the cutting force.

If |Ri_1−Ri| becomes larger than the threshold value S (YES in S62), the error detector 47 determines that the tool is in failure (S72). In this case, the error detector 47 transmits the halt signal and the error signal to the route creator 44 and to the HMI 40, respectively. On receiving these signals, the route creator 44 halts position instruction update and the HMI 40 displays an error on the screen (S81).

As described above, the NC apparatus 4 according to the third embodiment calculates the ratios R1 to R3 of processing force of the blades except for the first blade to processing force of the first blade using the second component. Then, the NC apparatus 4 determines that the tool is in failure when the absolute value of a difference between the ratios R1 to R3 at the start of processing and the ratios R1_1 to R3_1 after the start of processing, respectively, becomes equal to or larger than the threshold value S. In this way, the NC apparatus 4 according to the third embodiment can accurately detect small chipping or wear of each blade of the tool.

The third embodiment may be combined with the first embodiment and/or the second embodiment.

At least part of the failure detection method in an industrial machinery according to the present embodiment may be configured with hardware or software. When it is configured with software, a program that performs at least part of the functions of the failure detection method may be stored in a storage medium such as a flexible disk and CD-ROM, and then installed in a computer to run thereon. The storage medium may not be limited to a detachable one such as a magnetic disk and an optical disk but may be a standalone type such as a hard disk and a memory. Moreover, a program that achieves at least part of the functions of the failure detection method may be distributed via a communication network (including wireless communication) such as the Internet. The program may also be distributed via an online network such as the Internet or a wireless network, or stored in a storage medium and distributed under the condition that the program is encrypted, modulated or compressed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An industrial machinery comprising:
    a drive mechanism driving a control target that moves work or a tool;
    a motor operating the drive mechanism;
    a first position sensor detecting a position of the control target;
    a second position sensor detecting a position of the motor;
    a current controller controlling a supply current to the motor;
    a servo controller outputting a torque instruction to the current controller, the torque instruction deciding the supply current; and
    a numerical controller calculating a processing force of the control target to the work based on position information on the control target acquired from the first position sensor, position information on the motor acquired from the second position sensor, and the torque instruction, the numerical controller determining that the tool is in failure based on an absolute value of a second component of the processing force, the second component having a frequency equal to or higher than a predetermined frequency.

2. The industrial machinery according to claim 1, wherein the tool has at least one blade for cutting the work,
    wherein the drive mechanism cuts the work while rotating the tool, and
    the numerical controller determines that the tool is in failure if the second component becomes equal to or larger than a first threshold value during a term shorter than a period of the second component.

3. The industrial machinery according to claim 1, wherein the tool has a plurality of blades for cutting the work,
    wherein the drive mechanism cuts the work while rotating the tool, and
    the numerical controller uses the second component to calculate a ratio of processing force of a specific blade to processing force of a first blade among the plurality of blades and determines that the tool is in failure based on the ratio.

4. The industrial machinery according to claim 3, wherein the numerical controller determines that the tool is in failure if an absolute value of a difference between the ratio of the specific blade at a start of processing and the ratio of the specific blade after the start of processing becomes equal to or larger than a third threshold value.

5. A control method of an industrial machinery comprising a drive mechanism driving a control target that moves work or a tool, a motor operating the drive mechanism, a current controller controlling a supply current to the motor, a servo controller outputting a torque instruction to the current controller, the torque instruction deciding the supply current, and a numerical controller controlling the servo controller, the method comprising:
    calculating a processing force of the tool to the work by the numerical controller based on position information on the control target, position information on the motor, and the torque instruction; and
    determining that the tool is in failure if:
        an absolute value of a first component of the processing force becomes equal to or larger than a first threshold value while processing the work, the first component having a frequency lower than a predetermined frequency,
        based on an absolute value of a second component of the processing force, the second component having a frequency equal to or higher than the predetermined frequency, and
        if an absolute value of a difference between the ratio of the specific blade after the start of processing becomes equal to or larger than a third threshold value.

* * * * *